No. 679,848. Patented Aug. 6, 1901.
J. K. JESSUP.
INSECT EXTERMINATOR.
(Application filed Apr. 29, 1901.)
(No Model.)
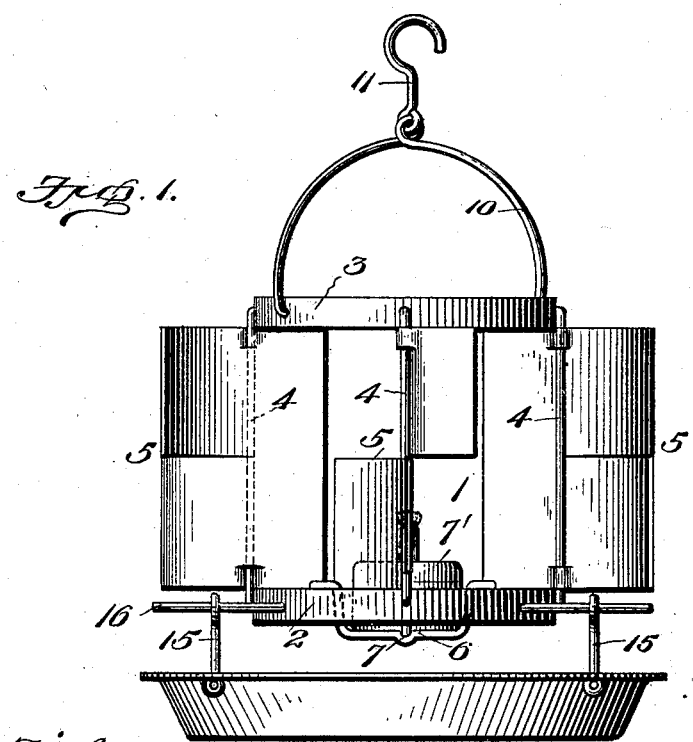
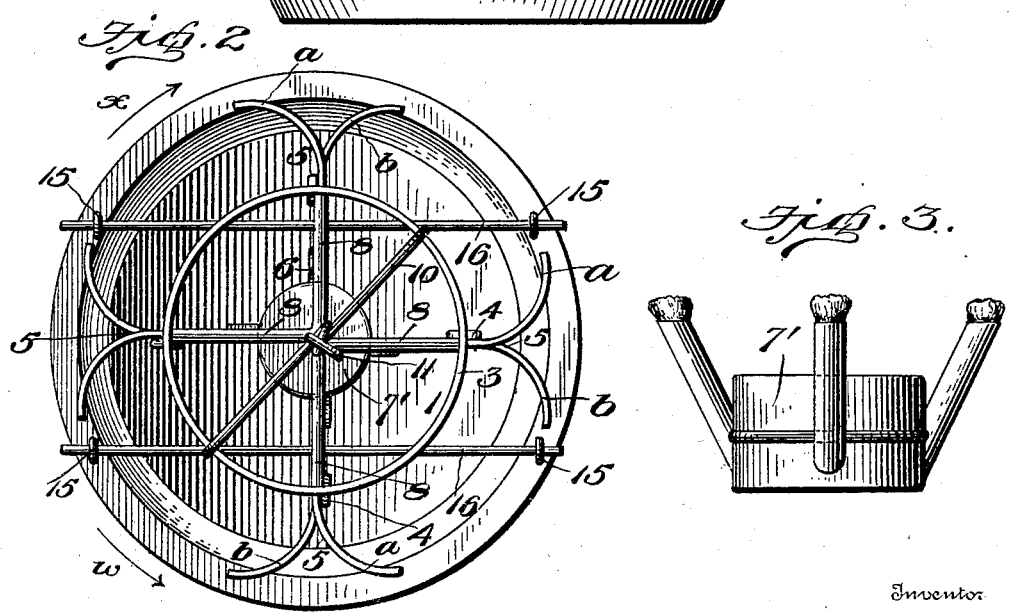
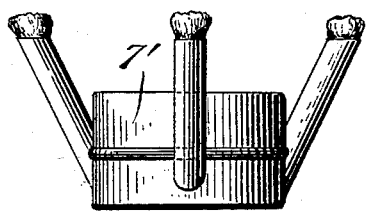
Inventor
John K. Jessup

UNITED STATES PATENT OFFICE.

JOHN KELSEY JESSUP, OF MOUND CITY, KANSAS, ASSIGNOR OF ONE-HALF TO O. M. WEST, OF SAME PLACE.

INSECT-EXTERMINATOR.

SPECIFICATION forming part of Letters Patent No. 679,848, dated August 6, 1901.

Application filed April 29, 1901. Serial No. 58,011. (No model.)

*To all whom it may concern:*

Be it known that I, JOHN KELSEY JESSUP, a citizen of the United States, residing at Mound City, in the county of Linn and State of Kansas, have invented certain new and useful Improvements in Insect-Exterminators; and I do declare the following to be a full, clear, and exact description of the invention, such as will enable others skilled in the art to which it appertains to make and use the same.

The invention relates to insect-exterminators.

The object of the invention is to provide a device of this character which shall be simple of construction, durable in use, and comparatively inexpensive of production and which may be hung in bushes, trees, or shrubbery or be supported from a receptacle containing a poisonous liquid. In the former event the extermination of the insects will be due to their passing through the flame, while in the latter event the extermination is due to their passing through the flames and of their being attracted to the flames and deflected downwardly into the receptacle containing the poisonous liquid.

With this and other objects in view the invention consists of certain novel features of construction, combination, and arrangement of parts, which will be hereinafter more fully described, and particularly pointed out in the appended claims.

In the accompanying drawings, Figure 1 is a side view of my improved insect-exterminator. Fig. 2 is a top plan view, and Fig. 3 is a side elevation of a modified form of torch.

In the drawings, 1 denotes the frame of the exterminator, which consists of a lower ring 2 and an upper ring 3, connected together by wire posts 4. 5 denotes radially-extending reflector-wings mounted upon said wire posts and each consisting of a brightly-polished piece of metal slit transversely a distance from its outer edge and having the members *a* and *b* curved in opposite directions. The member *a* of the reflector-wing projects in one direction, while the member *b* of the reflector-wing projects in the opposite direction. The lower ends of these reflectors are connected together by U-shaped cross-bars 6, one of which has a kink 7 to receive the other, and thereby interlock against movement. These cross-bars serve to steady or brace the reflector-wings and at the same time to form a seat for the torch 7', having a central wick-tube, as shown in Figs. 1 and 2, or having radially-extending tubes, as shown in Fig. 3. Each pair of the reflector-wings have their upper ends connected together by angular bars 8, which are grooved to receive the upper edges of said reflector-wings and brace them at these points.

10 denotes a bail hinged to the upper ring of the frame and provided with a hook 11, by means of which the device may be hung in position.

As thus described the device may be hung in trees, bushes, or shrubbery in general. As the insects are attracted by the reflected light from the torch they will be drawn to the flame and be destroyed by coming in contact therewith. If the insects fly in the general direction indicated by the arrow *w*, they will be attracted by the lower members of the reflector-wings, and if they fly in the general direction of the arrow *x* they will be attracted by the upper members of the reflector-wings, and when they fly directly toward the light or radially they will be attracted by the reflected light from the inner ends or edges of the reflector-wings, which ends or edges converge from their outer ends inwardly, and passing through the flame of the torch will be destroyed.

If desired, I may use in connection with the above-described structure a pan or receptacle the outer edges of which extend beyond the outer edges of the reflector-wings. Any suitable means may be employed for connecting the lower ring of the frame with the pan or receptacle—as, for instance, by providing the rim of the pan or receptacle with hooks 15 and passing through these hooks and holes formed in the lower ring of the frame a rod 16, thus detachably connecting the parts. This pan or receptacle is designed to contain a poisonous liquid, so that even should the insects fail to be exterminated by coming into contact with the flame they will when suddenly striking the reflector-wings be deflected into the pan containing the liquid and be exterminated.

While I have shown two different forms of illuminating devices, I would have it distinctly understood that I contemplate as falling within the scope of the invention, and I may use, any form of illuminating agent that I may desire.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. In an insect-exterminator, the combination with a suitable supporting-frame, of an illuminating agent supported thereby, and radially-disposed wings having extensions projecting in opposite directions, substantially as set forth.

2. In an insect-exterminator, the combination with a frame, consisting of upper and lower rings and posts connecting them together, of radially-projecting reflector-wings secured to said posts, the lower ends of the diametrically opposite wings being connected together and the upper ends of each pair of adjacent wings being connected together, and a torch placed between the inner edges of said wings, substantially as set forth.

3. In an insect-exterminator, the combination with a frame provided with radially-disposed vertically-extending reflector-wings, of a torch, a pan or receptacle, hooks secured to the pan or receptacle, and rods passed through the said frame and engaged with said hooks for releasably connecting the pan to the exterminator, substantially as set forth.

4. In an insect-exterminator, the combination with a frame, of radially-disposed wings having members $a$ and $b$, the members $a$ curved in one direction, and the members $b$ curved in the opposite direction, and a torch, substantially as set forth.

5. In an insect-exterminator, the combination with a frame, of radially-disposed reflectors, U-shaped cross-bars connecting the lower ends of said reflectors and interlocked at their point of intersection, and a torch seated upon the U-shaped cross-bars, substantially as set forth.

In testimony whereof I have hereunto set my hand in presence of two subscribing witnesses.

JOHN KELSEY JESSUP.

Witnesses:
SAMUEL J. COLEMAN,
JOHN L. GOVE.